UNITED STATES PATENT OFFICE.

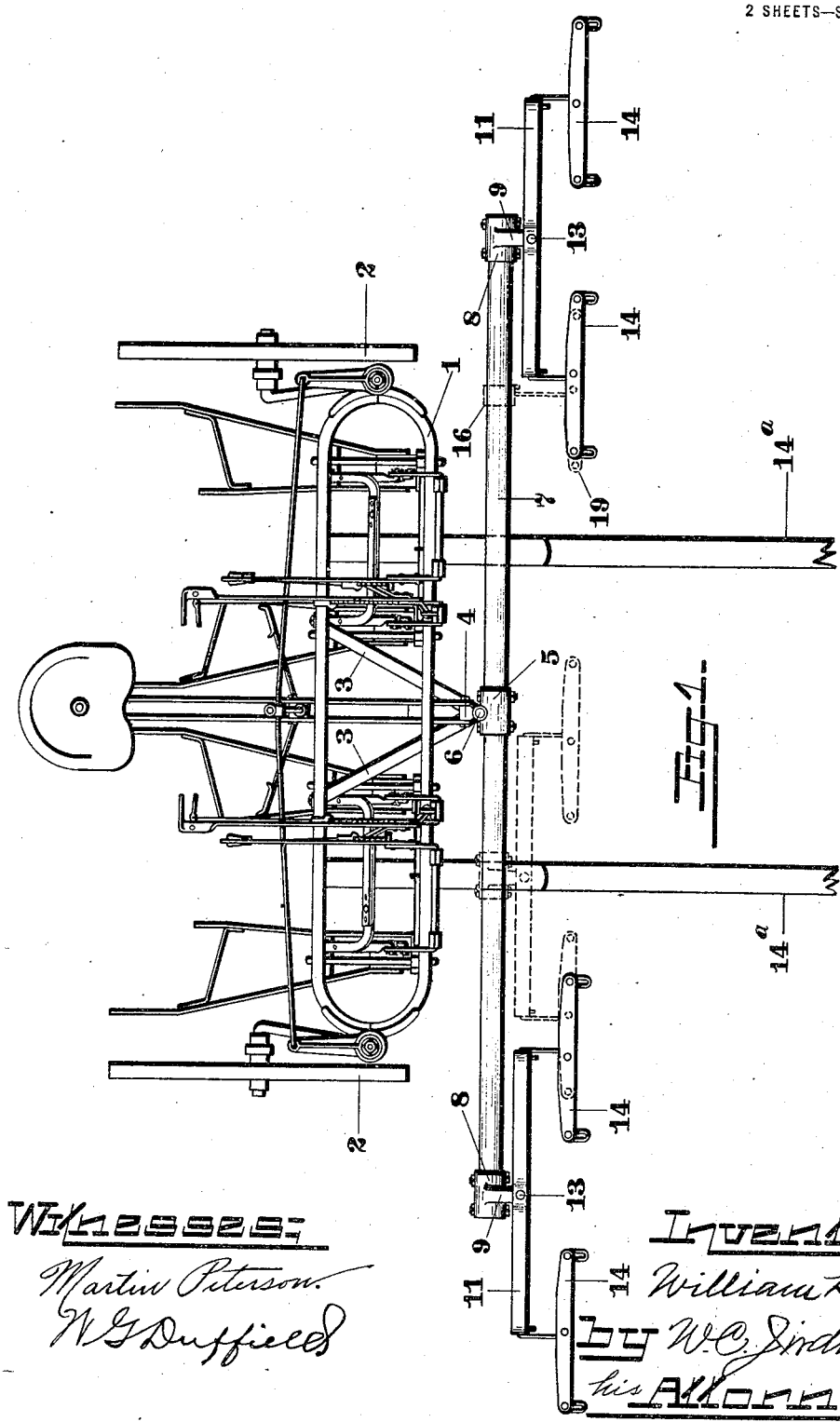

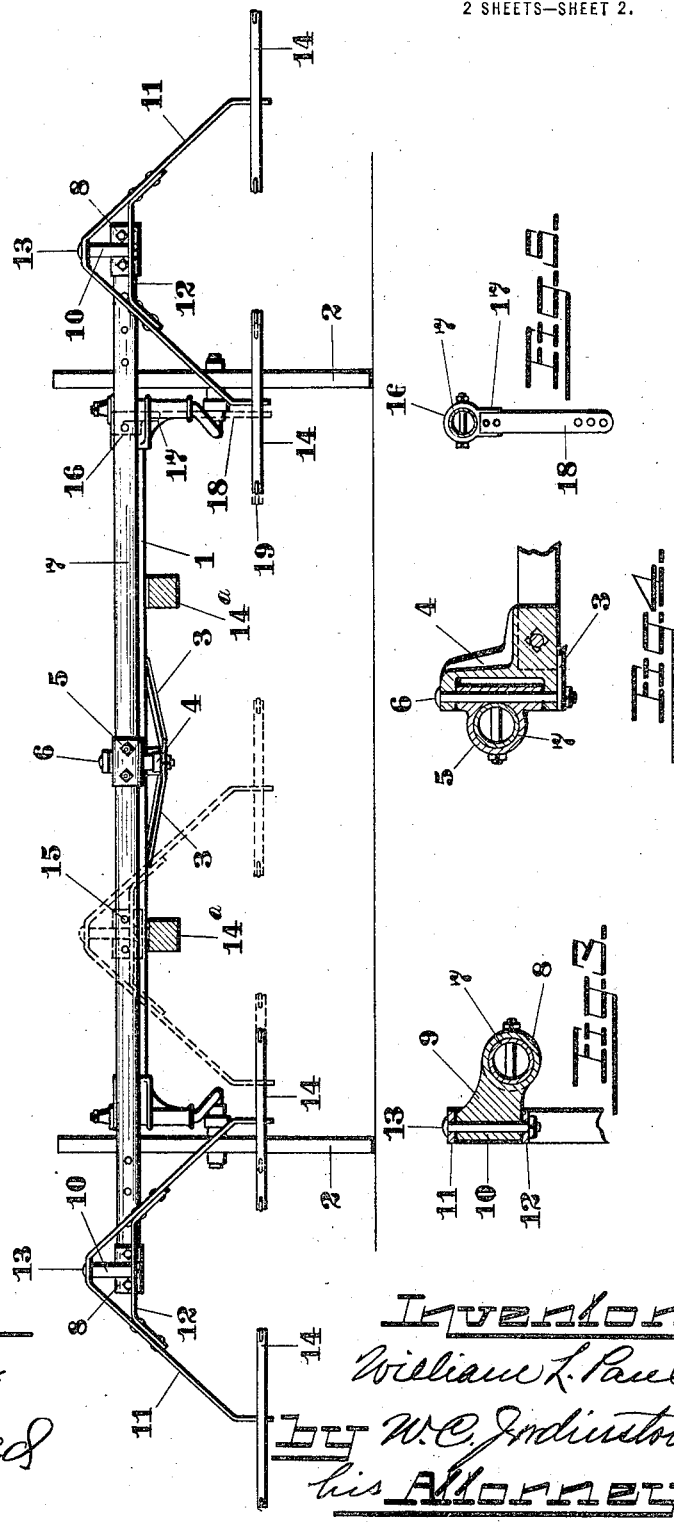

WILLIAM L. PAUL, OF SAN FRANCISCO, CALIFORNIA, ASSIGNOR TO DEERE & COMPANY, OF MOLINE, ILLINOIS, A CORPORATION OF ILLINOIS.

DRAFT-EVENER.

1,263,102.

Specification of Letters Patent.

Patented Apr. 16, 1918.

Application filed August 4, 1914. Serial No. 854,952.

*To all whom it may concern:*

Be it known that I, WILLIAM L. PAUL, a citizen of the United States, residing at San Francisco, in the county of San Francisco and State of California, have invented certain new and useful Improvements in Draft-Eveners, of which the following is a specification, reference being had therein to the accompanying drawing.

My invention relates to a draft evener available particularly for use with agricultural machines, and which can be readily adapted to three or four horses. The object of my invention is to provide an evener particularly adapted for use on cultivators operated in corn of an advanced growth, and at the same time provide a means of hitching each draft animal to the evener in a low plane so that down pressure upon the necks of the horses is practically eliminated.

Referring to the drawings in which similar numerals indicate identical parts—

Figure 1 is a plan view of a cultivator, shown in part, with my device attached.

Fig. 2 is a front elevation of a cultivator, as much of the implement being shown as is necessary to illustrate the application of my invention.

Figs. 3, 4 and 5 are details.

Ordinarily in implements having poles or shafts in which the doubletrees or swingletrees are connected to the implement practically in the same plane with the pole or shafts, the force of the draft operates to depress the forward ends of the poles or shafts, exerting a down pressure upon the neck yokes and consequently upon the necks of the horses, a condition which I have relieved by the following described mechanism.

A two-row cultivator frame 1 is supported on wheels 2; centrally of the frame 1, and projecting forwardly therefrom is rigidly secured a preferably triangular frame consisting of bars 3 converging at their forward ends and supporting a casting 4 which is rigidly secured to the bars 3 in any suitable manner; the casting 4, as shown in Fig. 3, is formed as a yoke coupling pivotally connected to a sleeve 5 by a king-pin or bolt 6. The sleeve 5 is mounted centrally on an evener-bar 7, preferably tubular in form, and is secured thereon by bolts passing through the sleeve 5 and evener-bar 7. On each end of the evener-bar 7, and secured in place by bolts, is a sleeve 8 having a forwardly projecting portion 9 and integral therewith a vertical portion 10 forming a bracket. A double tree 11 is centrally pivoted on the portion 10 of each bracket 8 and is bent downwardly each side of its pivot forming an inverted V, the limbs of which terminate below the center of the wheels 2. A brace 12 extends from one limb to the other of each double tree 11 and is securely bolted thereto; the center of the braces 12 contacting with the under side of the portions 10. A bolt 13 passes through each double-tree and portion 10, and through each brace 12, and is secured in place by a nut on its lower end, the bolt 13 being the pivot upon which each double tree turns.

The ends of the double-trees are bent downwardly to form supports for swingle-trees 14 which are attached thereto by hooks in the ordinary manner. Shafts 14ᵃ are mounted on the frame 1 and extend beneath the evener-bar 7 to which they are in no way connected.

In the drawings my device is shown arranged for four horses; to accommodate it to three horses, I remove the bolts, by which the right hand sleeve 8 is secured to the evener-bar 7, and slide the sleeve 8, carrying with it the double-tree 11 attached thereto, along the bar 7 until it is in the position shown in dotted lines in Figs. 1 and 2. Suitable holes 15 are provided at this point in the evener-bar 7 so that the bolts can be again utilized to hold the sleeve 8 rigidly in position. From the opposite end of the evener-bar 7 I remove the sleeve 8 and double-tree 11 and substitute therefor a sleeve 16 which I secure to the evener-bar 7 by a suitable bolt. Projecting downwardly from the sleeve 16, and preferably integral therewith, is an arm 17 to which is rigidly secured a pendant 18 to the lower end of which a swingle tree 19 is connected. By this arrangement one horse is between the shafts, and the remaining two horses are disposed outside of the shafts on opposite sides of the central horse.

The effectiveness is demonstrated by the low point at which the swingle-trees are connected to the double-trees or to the pendant 18, so that the force of the draft tends to lift the front of the cultivator and to relieve the neck-yokes from weight of the shafts; as shown there are no connections between my device and the cultivator other than the bars 3 on which the evener-bar 7 is pivotally supported. My device has proven simple, inexpensive and very successful in operation.

What I claim is—

1. In a device of the class described, the combination of a wheel supported cultivator, an evener-bar pivotally supported intermediate its ends thereon, a bracket secured on each end of the evener-bar and extending forwardly therefrom and having a vertical tubular portion at its forward end, a double-tree pivotally and centrally supported on the tubular portion of each bracket and extending divergingly downward from its center, a brace extending beneath the tubular portion of each bracket and secured on opposite sides thereof to the double-tree, and a bolt passing through said tubular portion, double-tree and brace.

2. In a device of the class described, the combination of a wheel supported cultivator, shafts secured thereto, an evener-bar pivotally supported intermediate its ends on said cultivator, a pivotal support on one end of the evener-bar having a double-tree pivoted thereon, means to adjust said support and double-tree on the evener-bar to a position intermediate the longitudinal center and end thereof, said double-tree in its adjusted position projecting downwardly on opposite sides of one of the shafts, a support on the other end of said evener-bar having a double-tree pivoted thereon, said support and double-tree being removable, and a pendant rigidly mounted on the evener-bar and adapted to be connected with draft means on its free end.

In testimony whereof I affix my signature in presence of two witneses.

WILLIAM L. PAUL.

Witnesses:
W. W. HEALEY,
G. T. WHEELER.

Copies of this patent may be obtained for five cents each, by addressing the "Commissioner of Patents, Washington, D. C."